(12) United States Patent
Kuang

(10) Patent No.: US 9,828,281 B2
(45) Date of Patent: Nov. 28, 2017

(54) FLUOROPHOSPHATE OPTICAL GLASS

(71) Applicant: CDGM GLASS CO., LTD, Chengdu, Sichuan (CN)

(72) Inventor: Bo Kuang, Chengdu (CN)

(73) Assignee: CDGM GLASS CO., LTD, Sichuan (CN)

( * ) Notice: Subject to any disclaimer, the term of this patent is extended or adjusted under 35 U.S.C. 154(b) by 0 days.

(21) Appl. No.: 15/025,734

(22) PCT Filed: Apr. 21, 2015

(86) PCT No.: PCT/CN2015/077074
§ 371 (c)(1),
(2) Date: Mar. 29, 2016

(87) PCT Pub. No.: WO2015/161779
PCT Pub. Date: Oct. 29, 2015

(65) Prior Publication Data
US 2016/0221864 A1    Aug. 4, 2016

(30) Foreign Application Priority Data
Apr. 22, 2014 (CN) .......................... 2014 1 0163034

(51) Int. Cl.
*C03C 3/247* (2006.01)

(52) U.S. Cl.
CPC .................... *C03C 3/247* (2013.01)

(58) Field of Classification Search
CPC ...................................................... C03C 3/247
See application file for complete search history.

(56) References Cited

U.S. PATENT DOCUMENTS

| | | | |
|---|---|---|---|
| 8,198,202 B2 | 6/2012 | Ikenishi | |
| 8,431,499 B2 | 4/2013 | Ikenishi | |
| 8,642,490 B2 | 2/2014 | Ikenishi | |
| 8,713,970 B2 | 5/2014 | Ikenishi | |
| 2006/0223689 A1* | 10/2006 | Ikenishi | ........... C03C 3/247 501/45 |
| 2007/0027017 A1 | 2/2007 | Hachitani | |
| 2009/0247386 A1 | 10/2009 | Ikenishi | |
| 2009/0298668 A1 | 12/2009 | Ikenishi | |
| 2010/0113247 A1* | 5/2010 | Ikenishi | ........... C03B 11/12 501/44 |
| 2012/0090358 A1 | 4/2012 | Ikenishi | |
| 2012/0245015 A1 | 9/2012 | Ikenishi | |

FOREIGN PATENT DOCUMENTS

| | | |
|---|---|---|
| CN | 103193385 A | 7/2013 |
| CN | 103332859 A | 10/2013 |
| EP | 1707541 A1 | 10/2006 |
| JP | 2012001422 A * | 1/2012 |
| JP | 2012-082114 A | 4/2012 |
| JP | 2014028744 A * | 2/2014 |
| JP | 2014028745 A * | 2/2014 |

OTHER PUBLICATIONS

Jul. 9, 2015 Search Report issued in International Patent Application No. PCT/CN2015/077074.

* cited by examiner

*Primary Examiner* — Elizabeth A. Bolden
(74) *Attorney, Agent, or Firm* — Oliff PLC

(57) ABSTRACT

An optical glass has refractive index nd greater than 1.59, Abbe number υd greater than 67, low photoelastic coefficient, good chemical stability and excellent grinding property. Fluorophosphate optical glass contains, by cation percentage contents, 30-40% of $P^{5+}$, 12-20% of $Al^{3+}$, 30-40% of $Ba^{2+}$, 1.3-12% of $Ca^{2+}$, 1-10% of $Sr^{2+}$, 0-5% of $La^{3+}$, 0-6% of $Gd^{3+}$, 0-10% of $Y^{3+}$, and contains, by anion percentage contents, 25-40% of $F^{+}$ and 60-75% of $O^{2-}$. The optical glass is applicable to the manufacturing methods such as high precision molding, secondary hot molding and cold working, in order to produce optical elements like high-performance sphere, aspheric surface, plane lens, prism and raster.

20 Claims, No Drawings

FLUOROPHOSPHATE OPTICAL GLASS

TECHNICAL FIELD

The invention relates to a fluorophosphate optical glass, especially relates to a fluorophosphate optical glass with high refractive index, low dispersion, low photoelastic coefficient as well as good chemical stability and processability.

BACKGROUND

Due to low dispersion and special dispersion, the fluorophosphate optical glass is suitable for being applied as lens material to remove higher-order aberration in optical design. Since low dispersion is usually accompanied by low refractive index, the fluorophosphate optical glass is not suitable for making lens with high diopter. The existing low dispersion fluorophosphate optical glass with high refractive index (nd>1.59) usually have problems such as insufficient chemical stability, heat stability and processability.

A fluorophosphate optical glass with low dispersion high refractive index was disclosed in JP H2-124740, but it is of poor heat stability and has high liquidus temperature. As a result, crystallization and stripe are easily made during production.

In addition, a fluorophosphate optical glass with good chemical stability was disclosed in Chinese patent application 201110129548.2, but it has insufficient refractive index (nd is lower than 1.58).

SUMMARY

The technical problem to be resolved in the present invention is to provide an optical glass having refractive index nd greater than 1.59, Abbe number υd greater than 67, low photoelastic coefficient, good chemical stability and excellent grinding property.

To solve the technical problem, the invention provides the fluorophosphate optical glass, which contains, by cation percentage contents, 30-40% of $P^{5+}$, 12-20% of $Al^{3+}$, 30-40% of $Ba^{2+}$, 1.3-12% of $Ca^{2+}$, 1-10% of $Sr^{2+}$, 0-5% of $La^{3+}$, 0-6% of $Gd^{3+}$, 0-10% of $Y^{3+}$, and contains, by anion percentage contents, 25-40% of $F^+$ and 60-75% of $O^{2-}$.

Furthermore, it also contains, by cation percentage contents: 0-5% of $Mg^{2+}$, 0-5% of $Zn^{2+}$, 0-3% of $Si^{4+}$, 0-5% of $B^{3+}$, 0-3 of $Ge^{4+}$, 0-12% of $Li^+$, 0-5% of $Na^+$, 0-5% of $K^+$, 0-5% of $Yb^{3+}$, 0-0.5% of $Sb^{3+}$, 0-1% of $Sn^{4+}$ and 0-1% of $Ce^{4+}$; and contains, by anion percentage contents, 0-1% of $Cl^-$, 0-1% of $I^-$ and 0-1% of $Br^-$.

Furthermore, it contains 0-3% of $Mg^{2+}$, 0-3% of $Zn^{2+}$, 0-1% of $Si^{4+}$, 0-1% of $Ge^{4+}$, 0-2% of $B^{3+}$, 0-10% of $Li^+$, 0-3% of $Na^+$, 0-3% of $K^+$, wherein the total amount of $Cl^-+I^-+Br^-$ is greater than 0 but less than or equal to 1%.

Furthermore, the $Li^+$, among three ions including $Li^+$, $Na^+$ and $K^+$, is preferably applied.

Furthermore, wherein the total amount of $Cl^-+I^-+Br^-$ is greater than 0 but less than or equal to 0.8%, preferably greater than 0 but less than or equal to 0.5%.

Furthermore, the $Cl^-$, among three ions including $Cl^-$, $I^-$ and $Br^-$, is preferably applied.

Furthermore, wherein the total amount of $Sb^{3+}+Sn^{4+}+Ce^{4+}$ is greater than 0 but less than or equal to 1%, preferably greater than 0 but less than or equal to 0.5%.

Furthermore, at least one of $Sb^{3+}$, $Sn^{4+}$ and $Ce^{4+}$ and at least one of $Cl^-$, $I^-$ and $Br^-$ are applied as clarifying agent.

Furthermore, the $P^{5+}$ is introduced by metaphosphate; the $Al^{3+}$ is introduced in the form of one or more of $Al(PO_3)_3$, $AlF_3$ and $Al_2O_3$, preferably one or more of $Al(PO_3)_3$ and $AlF_3$; the $Ba^{2+}$ is introduced in the form of one or more of $Ba(PO_3)_2$, $BaF_2$, $BaCO_3$, $BaCl_2$ and $Ba(NO_3)_2$, preferably one or more of $BaF_2$ and $BaCO_3$; the $Ca^{2+}$, $Sr^{2+}$ and $Mg^{2+}$ are respectively introduced in the form of one or more of fluoride, metaphosphate and carbonate thereof; the $La^{3+}$, $Gd^{3+}$, $Y^{3+}$ and $Yb^{3+}$ are introduced in the form of one or more of oxide and fluoride, preferably oxide; the $Sb^{3+}$, $Sn^{4+}$ and $Ce^{4+}$ are introduced in the form of one or more of oxide and fluoride, preferably oxide; the $F^-$ is introduced in the form of fluoride; the $O^{2-}$ is introduced in the form of one or more of metaphosphate, oxide, carbonate and nitrate; and the $Cl^-$, $I^-$ and $Br^-$ are respectively introduced in the form of $BaCl_2$, KI and KBr.

Furthermore, the content of $(Sr^{2+}+Ca^{2+}+La^{3+}+Gd^{3+}+Y^{3+})/Ba^{2+}$ is 0.22-0.65, preferably 0.25-0.50.

Furthermore, the total content of $La^{3+}+Gd^{3+}+Y^{3+}$ is 2-10%, preferably 3.3-8%.

Furthermore, there are 32-37.5% of $P^{5+}$, 12-19% of $Al^{3+}$, 32-38% of $Ba^{2+}$, 1.5-8% of $Ca^{2+}$, 1-8% of $Sr^{2+}$, 0-4% of $La^{3+}$, 1-5% of $Gd^{3+}$, 1-8% of $Y^{3+}$, 28-35% of $F^-$, and 65-72% of $O^{2-}$.

Furthermore, $Ba^{2+}$: 33-37.8%, $Sr^{2+}$: 2-8%.

Furthermore, $Al^{3+}/P^{5+}$ is less than 0.63.

Furthermore, the photoelastic coefficient B of the optical glass is less than $0.5 \times 10^{-12}$ Pa.

Furthermore, the special dispersion $\Delta P_{g,F}$ of the optical glass is above 0.011, preferably above 0.014, more preferably above 0.015.

Furthermore, the abrasiveness $F_A$ of the optical glass is less than 450, preferably less than 400, more preferably less than 350.

An optical element made of the above-mentioned fluorophosphate optical glass.

The advantages of the invention is to obtain the optical glass with high refraction, low dispersion, excellent special dispersion, good chemical stability and grinding property as well as excellent heat stability. With low photoelastic coefficient, the optical glass is applicable in the area with high demand on refractive index and heat stability of glass. The optical glass provided in the invention is applicable to the manufacturing methods such as high precision molding, secondary hot molding and cold working, in order to make optical elements like high-performance sphere, aspheric surface, plane lens, prism and raster.

DETAILED DESCRIPTION

The function of each composition and scope limitation of the present invention will be interpreted as follows.

It should be noted that each positive ion and the total content of positive ions are represented by "cation percentage contents", and each negative ion and the total content of negative ions are represented by "anion percentage contents" herein. The "cation percentage contents" refers to the percentage of certain positive ion in the total positive ions, and the "anion percentage contents" refers to the percentage of certain negative ion in the total negative ions. All above-mentioned contents are mole content.

$P^{5+}$ is the composition forming glass network. When its content is less than 30%, the stability of the glass is poor, while if its content is higher than 40%, it will be hard to obtain the high refractive index needed in the present invention. In consideration of the optical performance and chemical stability needed in the present invention, the preferred percentage composition of $P^{5+}$ is 32-37.5%.

In the present invention, $Al^{3+}$ is mainly used to improve the chemical stability and grinding processability of the glass. When its content is less than 12%, the chemical stability of glass will be poor, while if its content is higher than 20%, the crystallization will deteriorate and liquidus temperature will rise. Accordingly, the present invention preferably applies $Al^{3+}$ with content of 12-19%.

The inventor has found that the grinding capability of glass will be improved obviously by controlling the specific value of $Al^{3+}/P^{5+}$. In the present invention, $Al^{3+}/P^{5+}$ is less than 0.63, preferably, $Al^{3+}/P^{5+}$ is less than 0.6, and more preferably, $Al^{3+}/P^{5+}$ is less than 0.58.

$Ba^{2+}$ is an essential component in the present invention, which can improve the refractive index and heat stability of glass, and the coexistence of $Ba^{2+}$ and $P^{5+}$ are the key to obtain low photoelastic coefficient. When its content is less than 30%, the refractive index of glass is insufficient, while if its content is higher than 40%, the chemical stability of glass will decrease, especially, poor acid resistance. Therefore, its content is limited as 30-40%, preferably, 32-38%, and more preferably, 33-37.8%.

$Sr^{2+}$ is a necessary component in the present invention. The chemical stability of glass can be improved without decreasing the refractive index of glass obviously. When its content is less than 1%, there is no evident effect; while if its content is higher than 10%, the heat stability of glass will decrease. The preferred content is 1-8%, and more preferably, 2-8%.

$Ca^{2+}$ can improve the heat stability, acid resistance and grinding capability of glass. When its content is less than 1.3%, there is no evident effect while if its content is higher than 12%, both heat stability and refractive index of glass will decrease. Accordingly, the content is limited as 1.3-12%, preferably, 1.5-8%.

$La^{3+}$ can improve the refractive index of glass. Provided that the Abbe number of glass does not decline, the higher the refractive index is, the easier it will be to realize the miniaturization of optical element in optical system. Therefore, the existence of $La^{3+}$ will be favorable. When its content is higher than 5%, glass crystallization will deteriorate, so its content is limited as 0-5%, preferably, 0-4%.

$Gd^{3+}$ can improve the refractive index of glass. In the present invention, $Gd^{3+}$ is better than $La^{3+}$ as for the heat stability of glass. However, when its content is higher than 6%, the heat stability of glass will decline. Therefore, its content is limited as 0-6%, preferably, 1-5%.

$Y^{3+}$ can also improve the refractive index for the glass. In the present invention, its content can be higher than $La^{3+}$ and $Gd^{3+}$. When its content is higher than 10%, the glass devitrification will deteriorate. Therefore, its content is limited as 0-10%, preferably, 1-8%.

In the present invention, the key to improve glass refractive index while ensuring the heat stability of glass is not to decrease the Abbe number of $La^{3+}$, $Gd^{3+}$, $Y^{3+}$. When the total amount of $La^{3+}+Gd^{3+}+Y^{3+}$ is less than 2%, there is no obvious improvement of the refractive index; while if the total amount is more than 10%, the glass crystallization deteriorates obviously. Therefore, the total amount of $La^{3+}+Gd^{3+}+Y^{3+}$ is limited as 2-10%, preferably, 3.3-8%.

Through the keen research, the inventor has found finds the specific value of the total amount of $Sr^{2+}$, $Ca^{2+}$, $La^{3+}$, $Gd^{3+}$, $Y^{3+}$ to $Ba^{2+}$ play a decisive role on the chemical stability and photoelastic coefficient of glass in the present invention. When the $(Sr^{2+}+Ca^{2+}+La^{3+}+Gd^{3+}+Y^{3+})/Ba^{2+}$ is less than 0.22, the acid resistance of glass will be insufficient and its processability will get worse, while if the $(Sr^{2+}+Ca^{2+}+La^{3+}+Gd^{3+}+Y^{3+})/Ba^{2+}$ is more than 0.65, the photoelastic coefficient increase obviously. To meet the requirements in the present invention, the $(Sr^{2+}+Ca^{2+}+La^{3+}+Gd^{3+}+Y^{3+})/Ba^{2+}$ is limited as 0.22-0.65, preferably, 0.25-0.50.

$Mg^{2+}$ is a dispensable component in the present invention and can improve the heat stability and grinding performance of glass. When its content is higher than 5%, the glass refractive index can meet the requirement. Therefore, the content is limited as 0-5%, preferably, 0-3%.

$Zn^{2+}$ is a dispensable composition in the present invention and can improve the refractive index of glass as well as lower glass transition temperature, but higher dispersion may decrease the glass Abbe number. Therefore, the content of $Zn^{2+}$ is limited as 0-5%, preferably, 0-3%.

$Yb^{3+}$ can improve the refractive index of glass. When its content is higher than 5%, the heat stability of glass will decline. Therefore, its content is limited as 0-5%, preferably 0, since its intrinsic absorption of $Yb^{3+}$ occurs on near-infrared band.

$F^-$ is the key component to make the glass with low dispersion and anomalous dispersion. If its content is less than 25%, the required performance is hard to be met, while if its content is more than 40%, it is hard to obtain the glass with high refractive index. Therefore, its content is limited as 25-40%, preferably, 28-35%.

$O^{2-}$ is a necessary component for constituting the glass network structure in the present invention. When its content is lower than 60%, the glass stability will be insufficient and the refractive index needed by the present invention will hard be satisfied; while if its content is higher than 75%, the low dispersion and anomalous dispersion will be hard to be acquired. Therefore, the content of the $O^{2-}$ is limited as 60-75%, preferably, 65-72%.

In fluorophosphate glass, the halogen element is commonly used as clarifying agent. In terms of the present invention, $Cl^-$, $I^-$ and $Br^-$ can be used as the clarifying agent. When its usage amount is too higher, the smelting unit (for instance, platinum and platinum alloy vessel) may be damaged. Therefore, its content is limited as 0-1%, preferably, 0-0.5%. The total amount of $Cl^-+I^-+Br^-$ is limited as greater than 0 but less than or equal to 1%, preferably greater than 0 but less than or equal to 0.8%, and more preferably greater than 0 but less than or equal to 0.5%. In the above three clarifying agents, $Cl^-$ is used preferably, followed by $I^-$.

As the clarifying agent for the glass, $Sb^{3+}$, $Sn^{4+}$ and $Ce^{4+}$ can also be used, and their contents are limited respectively as 0-0.5%, 0-1% and 0-1%. In the present invention, due to high content of $O^{2-}$, the effect is not ideal if the halogen element is used as the clarifying agent alone. The inventor found through repeated experiment researches that the ideal effect for removing bubble can be achieved by using at least one of the $Sb^{3+}$, $Sn^{4+}$ and $Ce^{4+}$ as well as at least one of the halogen elements of $Cl^-$, $I^-$ and $Br^-$. The present invention limits the total amount of $Sb^{3+}+Sn^{4+}+Ce^{4+}$ as greater than 0 but less than or equal to 1%, preferably greater than 0 but less than or equal to 0.5%.

In the present invention, an appropriate amount of $B^{3+}$ is also used. In spite of this, if its content is too high, the volatilization will be larger, and the stability of glass will decrease. Therefore, the content is limited as 0-5%, preferably, 0-2%, and more preferably, 0

A small amount of $Si^{4+}$ and $Ge^{4+}$ can be used in the glass of the present invention. If its content is higher than 3%, the glass melting temperature increases obviously and the glass devitrification performance will deteriorate. Therefore, the content of $Si^{4+}$ and $Ge^{4+}$ is limited respectively as 0-3%, preferably, 0-1%, and more preferably, 0.

Three alkali metal ions $Li^+$, $Na^+$ and $K^+$ can decrease the smelting temperature, high-temperature viscidity and the transformation temperature of the glass. In spite of this, if their contents are too high, the glass devitrification will deteriorate. Therefore, the content of $Li^+$ is limited as 0-12%, preferably, 0-10%, and the contents of $Na^+$ and $K^+$ are limited respectively as 0-5%, preferably, 0-3%. The $Li^+$, among three ions including $Li^+$, $Na^+$ and $K^+$, is preferably applied.

The present invention does not apply the components such as Pb, As, Cd and Th that are bad for the environment and does not apply or reduces as far as possible the components of Co, Cu, Fe, Ni, Cr and Mn that are harmful to the transmittance of glass.

As for the manufacturing method in the present invention, the glass composition can apply the corresponding oxide, carbonate, nitrate, hydroxide, phosphate, metaphosphate and fluoride as the batch mixture, and the mixed batch mixture can be acquired in the platinum (or platinum alloy) crucible through heating, melting, clarifying and homogenizing. To ensure the stability of glass quality, the material without water (including the crystal water and free water) is preferred. Among the materials in the present invention, the $P^{5+}$ is introduced by metaphosphate; the $Al^{3+}$ is introduced in the form of one or more of $Al(PO_3)_3$, $AlF_3$ and $Al_2O_3$, preferably one or more of $Al(PO_3)_3$ and $AlF_3$; since the introduce of $Al^{3+}$ and $Al_2O_3$ will deteriorate the glass crystallization performance; the $Ba^{2+}$ is introduced in the form of one or more of $Ba(PO_3)_2$, $BaF_2$, $BaCO_3$, $BaCl_2$ and $Ba(NO_3)_2$, preferably one or more of $BaF_2$ and $BaCO_3$; when the $Ba(NO_3)_2$ is introduced, its percentage composition relative to that of the oxide is not suitable to surpass 3%, because when the content of $Ba(NO_3)_2$ is too higher, the melting temperature will increase greatly; the $Ca^{2+}$, $Sr^{2+}$ and $Mg^{2+}$ are respectively introduced in the form of one or more of fluoride, metaphosphate and carbonate thereof; the $La^{3+}$, $Gd^{3+}$, $Y^{3+}$ and $Yb^{3+}$ are introduced in the form of one or more of oxide and fluoride, preferably oxide; the $Sb^{3+}$, $Sn^{4+}$ and $Ce^{4+}$ are introduced in the form of one or more of oxide and fluoride, preferably oxide; In the negative ion, $F^-$ can be introduced in the form of the above-mentioned fluoride material, $O^{2-}$ can be introduced in the form of one or more of the metaphosphate, oxides, carbonates and nitrates, and $Cl^-$, $I^-$ and $Br^-$ are mainly introduced in the form of halide, preferably, $BaCl_2$, $KI$ and $KBr$.

To achieve the desired effect of the present invention, the content of $Ba^{2+}$ and $O^{2-}$ is high, so the $Ba^{2+}$ and $O^{2-}$ are introduced in the form of $Ba(CO_3)_2$ with its weight percentage content above 10%, preferably, above 25%. In addition, to solve the bubble issues caused by $Ba(CO_3)_2$, the inventor creatively use at least one of the $Sb^{3+}$, $Sn^{4+}$ and $Ce^{4+}$ as well as at least one of the halogen elements of $Cl^-$, $I^-$ and $Br^-$ as the clarifying agent to obtain the ideal effect for removing bubbles.

The glass of the present invention has liquidus temperature below 900° C., in which the glass has excellent molding viscosity when the glass block material or material-log is formed, and the volatilization of F can be decreased so as to be favorable to obtain the high-quality glass without stripes.

Though precision annealing, the double refraction will not exist inside the optical glass, but if the glass has a temperature difference in case of mechanical force effect or heating and cooling, there will be stress inside the glass which causes the change of optical performance to generate double refraction. The relation between optical path difference $\delta$(nm) of the photoelastic coefficient (also called stress optical coefficient) B and birefringence, the stress difference $F(10^5 Pa)$ inside the glass, and the glass thickness d(cm) is $\delta = B \cdot d \cdot F$.

Low photoelastic coefficient means small birefringence when the glass undergoes temperature variation and the impact of external forces, which is suitable to make optical device with high stability requirement, for instance, the optical device controlling polarized light. The glass in the present invention has photoelastic coefficient less than $0.5 \times 10^{-12}$ Pa, so it is suitable to make the base plate and prism for polarized light spectrum splitter, the component for spatial light modulator to control the polarized light and the electric optical glass substrate and parts.

The glass in the present invention has large positive special dispersion $\Delta P_{g,F}$, which is good for the correction of advanced color difference in optical system. The mathematical expression of relative partial dispersion $P_{g,F}$ is as follows:

$$P_{g,F} = (n_g - n_F)/(n_F - n_c)$$

Where the $n_g$, $n_F$ and $n_c$ respectively correspond to the refractive indexes of line g (435.84 nm), line F (486.13 nm) and line c (656.27 nm)

As regards the H-K6 and F4 as the standard normal glass, its relative partial dispersion and Abbe number conforms to the following formula:

$$P_{g,F}^{(z)} = 0.6457 - 0.001703 \times \upsilon d$$

The special dispersion $\Delta P_{g,F}$ is the difference value of relative partial dispersion $P_{g,F}$ deviating the normal line, represented by the following formula:

$$\Delta P_{g \cdot F} = P_{g \cdot F} - P_{g \cdot F}^{(z)}$$
$$= P_{g \cdot F} - 0.6457 + 0.001703 \times \upsilon d$$

The glass with bigger $\Delta P_{g,F}$ will be more suitable for the correction of high-order aberration. The special dispersion $\Delta P_{g,F}$ of the glass provided the present invention is above 0.011, preferably above 0.014, and more preferably, above 0.015.

The fluorophosphate glass is usually relatively "soft" and has large abrasiveness value. When there is large abrasiveness value, the grinding and polishing will be difficult, and the precision machining on the glass surface will be hard to realize. As a result, the processing efficiency is affected. Therefore, the abrasiveness of the glass in the present invention is less than 450, preferably less than 400, more preferably less than 350. Therefore, the glass in the present invention has good abrasive machining performance.

In the process of manufacture, storage, transportation and use, the capability of the glazed surface of optical glass components to resist various erosion media effects becomes the chemical stability of the glass. As a result, the glass in the present invention has good chemical stability. By applying the test method of powder method, its waterproof stability $D_W$ belongs to Type 1, and the acid-proof stability $D_A$ belongs to Type 2 and above, preferably, Type 1.

The optical glass provided in the invention is applicable to the manufacturing methods such as high precision molding, secondary hot molding and cold working, in order to make optical elements like high-performance sphere, aspheric surface, plane lens, prism and raster.

The embodiments of the present invention are as follows, but the present invention is not constrained by the following.

Tables 1, 2 and 3 list the ingredient components of embodiments and comparison examples of the optical glass provided by the present invention, and the refractive index (nd), Abbe number (ud), special dispersion ($\Delta P_{g,\,F}$), transition temperature (Tg), photoelastic coefficient (B), liquidus temperature (L.T), abrasiveness ($F_A$), chemical stability $D_W$ and $D_A$, and wavelength ration of external optical transmittance of 80% and 5% represented by $\lambda 80$, $\lambda 5$ respectively.

The raw materials used in the optical glass as mentioned in the embodiments and comparison examples applies the oxide, fluoride, compound phosphate, hydroxide, carbonate and nitrate corresponding to the ingredient components listed in Tables 1-4. The optical glass is prepared by the following steps: proportionally weighting, mixing fully and then adding into a platinum crucible, melting at 900-1200° C., clarifying, homogenizing and then cooling to a proper temperature; and then casting the fused glass into the preheated metal module, and placing them into an annealing furnace, annealing slowing to obtain the experimental sample, and measuring related parameters by sampling.

The properties of the above glass can be measured by the following method:

Optical constant and special dispersion: $n_d$, $n_g$, $n_F$, $n_c$ and Abbe number ud are calculated according to the measuring method for refractive index specified in GB/T 7962.11-2010 and special dispersion $\Delta P_{g,\,F}$ is calculated by the above formula of special dispersion.

Transition temperature (Tg) is measured as per the method specified in GB/T 7962.16-2010.

Photoelastic coefficient B is calculated by using the data obtained by imposing rated load gravity on the diameter direction of test samples with circular plate shape by He-Ne laser (wavelength of 632.8 nm), and then measuring the optical path difference produced at the center of circular plate.

Liquidus temperature (L.T) is measured as below: placing about 100 ml glass into a platinum crucible, heating to 1050° C. to completely melt the glass, cooling to the predetermined temperature for 2 hours, and then pouring the glass into cast iron or graphite module, checking the glass by microscope with a magnification of 100 times after cooling. The lowest holding temperature of crystal unobserved is the liquidus temperature of glass. The foregoing high temperature experiment should be conducted under the protection of nitrogen because there is F component in the present invention. The "liquidus temperature" in Tables 1-4 in the embodiments of the invention is the lowest temperature of crystal unobserved after cooling for 2 hours. The real liquidus temperature is lower than or equal to the temperature listed in the table.

Abrasiveness $F_A$ refers to the data received by the ratio of the abrasion quantity of sample to the abrasion quantity (volume) of the standard sample (K9 optical glass) multiplying by 100 with the formula:

$$F_A = V/V_0 \times 100 = (W/\rho) \div (W_0/\rho_0) \times 100$$

Wherein V and $V_0$ represent the volume abrasion quantity of the measured sample and standard sample respectively; W and $W_0$ represent the mass abrasion quantity of the measured sample and standard sample respectively; and $\rho$ and $\rho_0$ represent the density of the measured sample and standard sample respectively.

The chemical stability $D_W$ and $D_A$ are calculated as per the testing method specified in GB/T 17129; and the leaching percentage of the glass is calculated according to the following formula.

$$D = (B-C)/(B-A) \times 100$$

Where: D—the leaching percentage of glass (%);
B—the mass of filter and sample (g);
C—the mass of filter and the eroded sample (g);
A—the mass of filter (g);

The water durability $D_W$ of optical glass is classified into six categories as per the calculated leaching percentage. Please see the following table for details.

| Category | 1 | 2 | 3 | 4 | 5 | 6 |
|---|---|---|---|---|---|---|
| Leaching Percentage (Dw) | <0.04 | 0.04~0.10 | 0.10~0.25 | 0.25~0.60 | 0.60~1.10 | >1.10 |

The acid durability $D_A$ of the optical glass is classified as six categories as per the leaching percentage calculated out.

| Category | 1 | 2 | 3 | 4 | 5 | 6 |
|---|---|---|---|---|---|---|
| Leaching Percentage (DA) | <0.20 | 0.20~0.35 | 0.35~0.65 | 0.65~1.20 | 1.20~2.20 | >2.20 |

Degree of pigmentation $\lambda_{80}/\lambda_5$ is used to represent the characteristic of short wave of the glass transmitting spectrum. The thickness of the measured sample is 10±0.1 mm, and $\lambda_{80}$ and $\lambda_5$ represent the corresponding wavelength when the transmittance (including surface reflection loss) of glass reaches 80% and 5% with unit of 10 nm.

TABLE 1

| Composition | Embodiments | | | | | | |
| | 1 | 2 | 3 | 4 | 5 | 6 | 7 |
|---|---|---|---|---|---|---|---|
| $P^{5+}$ | 35.0 | 34.7 | 34.5 | 35.55 | 34.4 | 34.75 | 34.75 |
| $Al^{3+}$ | 17.4 | 15.75 | 12.4 | 19.7 | 15.65 | 17.3 | 17.6 |
| $Al^{3+}/P^{5+}$ | 0.497 | 0.454 | 0.359 | 0.554 | 0.455 | 0.498 | 0.506 |
| $Ba^{2+}$ | 36.6 | 36.05 | 35.2 | 36.55 | 34.2 | 36.75 | 37.0 |
| $Sr^{2+}$ | 2.8 | 4.2 | 6.35 | 1.25 | 4.1 | 2.75 | 2.7 |
| $Ca^{2+}$ | 3.5 | 2.7 | 1.6 | 5.09 | 2.7 | 3.45 | 3.7 |
| $La^{3+}$ | 0.7 | 1.0 | 1.5 | 0.5 | 1.4 | 0.65 | |
| $Gd^{3+}$ | 1.4 | 2.15 | 3.2 | 0.6 | 2.1 | 1.4 | 3.02 |
| $Y^{3+}$ | 2.2 | 3.43 | 5.15 | 0.7 | 4.3 | 2.01 | 1.2 |
| $La^{3+} + Gd^{3+} + Y^{3+}$ | 4.3 | 6.58 | 9.85 | 1.8 | 7.8 | 4.06 | 4.22 |
| $(Sr^{2+} + Ca^{2+} + La^{3+} + Gd^{3+} + Y^{3+})/Ba^{2+}$ | 0.290 | 0.374 | 0.506 | 0.223 | 0.427 | 0.279 | 0.287 |

TABLE 1-continued

| Composition | 1 | 2 | 3 | 4 | 5 | 6 | 7 |
|---|---|---|---|---|---|---|---|
| $Mg^{2+}$ | 0.36 | | | | 1.11 | 0.9 | |
| $Zn^{2+}$ | | | 0.19 | | | | |
| $Yb^{3+}$ | | | | | | | |
| $Li^+$ | | | | | | | |
| $Na^+$ | | | | | | | |
| $K^+$ | | | | | | | |
| $Sb^{3+}$ | 0.04 | 0.02 | 0.01 | | 0.04 | 0.04 | 0.03 |
| $Sn^{4+}$ | | | | | | | |
| $Ce^{4+}$ | | | | 0.06 | | | |
| $Sb^{3+}+Sn^{4+}+Ce^{4+}$ | 0.04 | 0.02 | 0.01 | 0.06 | 0.04 | 0.04 | 0.03 |
| $B^{3+}$ | | | | | | | |
| $Si^{4+}$ | | | | | | | |
| $Ge^{4+}$ | | | | | | | |
| $F^-$ | 32.4 | 33.43 | 35.5 | 30.86 | 34.41 | 32.86 | 31.8 |
| $O^{2-}$ | 67.5 | 66.35 | 64.4 | 68.74 | 65.38 | 66.87 | 68.05 |
| $Cl^-$ | 0.1 | 0.22 | 0.1 | 0.4 | 0.21 | 0.27 | 0.15 |
| $I^-$ | | | | | | | |
| $Br^-$ | | | | | | | |
| $Cl^- + I^- + Br^-$ | 0.1 | 0.22 | 0.1 | 0.4 | 0.21 | 0.27 | 0.15 |
| nd | 1.5930 | 1.5973 | 1.5958 | 1.5935 | 1.597 | 1.596 | 1.5945 |
| υd | 68.30 | 67.62 | 67.8 | 68.6 | 67.75 | 68.11 | 68.2 |
| $\Delta P_{g \cdot F}$ | 0.0155 | 0.0150 | 0.0147 | 0.153 | 0.0146 | 0.0154 | 0.0151 |
| Tg (° C.) | 565 | 558 | 535 | 572 | 560 | 560 | 496 |
| $B(10^{-12}/Pa)$ | 0.36 | 0.39 | 0.47 | 0.39 | 0.42 | 0.35 | 0.38 |
| L.T(° C.) | ≤850 | ≤820 | ≤880 | ≤850 | ≤850 | ≤850 | ≤850 |
| $F_A$ | 330 | 338 | 360 | 350 | 341 | 330 | 342 |
| DW | 1 | 1 | 1 | 1 | 1 | 1 | 1 |
| $D_A$ | 1 | 1 | 1 | 2 | 1 | 1 | 1 |
| λ80/λ5 | 37/31 | 37/31 | 35/29 | 37/31 | 37/31 | 37/31 | 37/31 |

TABLE 2

| Composition | 8 | 9 | 10 | 11 | 12 | 13 | 14 |
|---|---|---|---|---|---|---|---|
| $P^{5+}$ | 32.0 | 34.65 | 34.95 | 34.95 | 34.8 | 35.05 | 34.4 |
| $Al^{3+}$ | 18.45 | 15.0 | 17.2 | 17.35 | 17.3 | 19.2 | 12.9 |
| $Al^{3+}/P^{5+}$ | 0.577 | 0.433 | 0.492 | 0.496 | 0.497 | 0.548 | 0.375 |
| $Ba^{2+}$ | 34.1 | 36.1 | 35.9 | 36.2 | 36.0 | 36.7 | 32.2 |
| $Sr^{2+}$ | 1.85 | 4.5 | 2.75 | 2.77 | 2.96 | 1.85 | 9.4 |
| $Ca^{2+}$ | 2.8 | 2.6 | 3.5 | 3.5 | 3.5 | 4.4 | 1.6 |
| $La^{3+}$ | | 1 | 0.65 | | 3.05 | | 1.04 |
| $Gd^{3+}$ | 1.1 | 3.13 | 1.25 | 3.05 | | 1.62 | 3.15 |
| $Y^{3+}$ | 1.9 | 3 | 2.9 | 1.28 | 1.76 | 0.7 | 5.0 |
| $La^{3+} + Gd^{3+} + Y^{3+}$ | 3.0 | 7.13 | 4.8 | 4.33 | 4.81 | 2.32 | 9.19 |
| $(Sr^{2+} + Ca^{2+} + La^{3+} + Gd^{3+} + Y^{3+})/Ba^{2+}$ | 0.224 | 0.394 | 0.308 | 0.293 | 0.313 | 0.234 | 0.627 |
| $Mg^{2+}$ | | | 0.35 | 0.87 | 0.6 | 0.45 | |
| $Zn^{2+}$ | | | 0.5 | | | | |
| $Yb^{3+}$ | | | | | | | |
| $Li^+$ | 7.77 | | | | | | |
| $Na^+$ | | | | | | | |
| $K^+$ | | | | | | | 0.27 |
| $Sb^{3+}$ | 0.03 | 0.02 | 0.05 | 0.03 | 0.03 | 0.03 | 0.04 |
| $Sn^{4+}$ | | | | | | | |
| $Ce^{4+}$ | | | | | | | |
| $Sb^{3+}+Sn^{4+}+Ce^{4+}$ | 0.03 | 0.02 | 0.05 | 0.03 | 0.03 | 0.03 | 0.04 |
| $B^{3+}$ | | | | | | | |
| $Si^{4+}$ | | | | | | | |
| $Ge^{4+}$ | | | | | | | |
| $F^-$ | 28.98 | 33.7 | 32.51 | 33.15 | 33.03 | 30.99 | 39.45 |
| $O^{2-}$ | 70.84 | 66.2 | 67.28 | 66.74 | 66.87 | 68.87 | 60.45 |
| $Cl^-$ | 0.18 | 0.1 | 0.21 | 0.11 | 0.1 | 0.14 | |
| $I^-$ | | | | | | | 0.1 |
| $Br^-$ | | | | | | | |
| $Cl^- + I^- + Br^-$ | 0.18 | 0.1 | 0.21 | 0.11 | 0.1 | 0.14 | 0.1 |
| nd | 1.5972 | 1.5952 | 1.5959 | 1.5917 | 1.5949 | 1.5933 | 1.5902 |
| υd | 68.4 | 68.05 | 68.39 | 68.52 | 68.53 | 68.34 | 68.1 |
| $\Delta P_{g \cdot F}$ | 0.0132 | 0.0149 | 0.0152 | 0.0151 | 0.015 | 0.0152 | 0.0141 |
| Tg (° C.) | 450 | 471 | 560 | 565 | 568 | 570 | 525 |
| $B(10^{-12}/Pa)$ | 0.36 | 0.41 | 0.37 | 0.38 | 0.38 | 0.36 | 0.5 |

TABLE 2-continued

| | Embodiments | | | | | | |
|---|---|---|---|---|---|---|---|
| Composition | 8 | 9 | 10 | 11 | 12 | 13 | 14 |
| L.T(° C.) | ≤850 | ≤880 | ≤850 | ≤850 | ≤850 | ≤850 | ≤890 |
| $F_A$ | 350 | 352 | 330 | 320 | 315 | 330 | 386 |
| $D_W$ | 1 | 1 | 1 | 1 | 1 | 1 | 1 |
| $D_A$ | 2 | 1 | 1 | 1 | 1 | 2 | 1 |
| λ80/λ5 | 35/28 | 36/30 | 37/31 | 37/31 | 37/31 | 37/31 | 35/30 |

TABLE 3

| | Embodiments | | | | | | |
|---|---|---|---|---|---|---|---|
| Composition | 15 | 16 | 17 | 18 | 19 | 20 | 21 |
| $P^{5+}$ | 35.3 | 34.6 | 34.7 | 34.7 | 34.7 | 37.1 | 38.4 |
| $Al^{3+}$ | 18.70 | 13.7 | 17.25 | 16.3 | 15.75 | 14.5 | 13.1 |
| $Al^{3+}/P^{5+}$ | 0.53 | 0.396 | 0.497 | 0.47 | 0.454 | 0.391 | 0.341 |
| $Ba^{2+}$ | 36.95 | 35.6 | 35.4 | 36.5 | 35.9 | 38.0 | 39.2 |
| $Sr^{2+}$ | 1.75 | 5.4 | 2.75 | 3.6 | 4.2 | 3.5 | 4.2 |
| $Ca^{2+}$ | 5.03 | 2.08 | 3.41 | 3.2 | 2.7 | 2.8 | 1.5 |
| $La^{3+}$ | | 1.2 | 0.7 | 0.37 | | 0.2 | 0.5 |
| $Gd^{3+}$ | 0.6 | 3.5 | 1.4 | 3.3 | 3.15 | 2.06 | 1.56 |
| $Y^{3+}$ | 1.6 | 3.9 | 3.5 | 2.0 | 3.43 | 1.8 | 1.0 |
| $La^{3+} + Gd^{3+} + Y^{3+}$ | 2.2 | 8.6 | 5.6 | 5.67 | 6.58 | 4.06 | 3.06 |
| $(Sr^{2+} + Ca^{2+} + La^{3+} + Gd^{3+} + Y^{3+})/Ba^{2+}$ | 0.243 | 0.452 | 0.360 | 0.342 | 0.375 | 0.273 | 0.223 |
| $Mg^{2+}$ | | | 0.85 | | | | 0.5 |
| $Zn^{2+}$ | | | | | | | |
| $Yb^{3+}$ | | | | | | | |
| $Li^+$ | | | | | | | |
| $Na^+$ | | | | | | | |
| $K^+$ | | | | | | | |
| $Sb^{3+}$ | | 0.02 | 0.04 | 0.03 | 0.03 | 0.04 | 0.04 |
| $Sn^{4+}$ | 0.07 | | | | | | |
| $Ce^{4+}$ | | | | | | | |
| $Sb^{3+} + Sn^{4+} + Ce^{4+}$ | 0.07 | 0.02 | 0.04 | 0.03 | 0.03 | 0.04 | 0.04 |
| $B^{3+}$ | | | | | | | |
| $Si^{4+}$ | | | | | | | |
| $Ge^{4+}$ | | | | | | | |
| $F^-$ | 27.78 | 34.6 | 33.53 | 32.7 | 33.38 | 27.2 | 26.7 |
| $O^{2-}$ | 71.81 | 65.3 | 66.2 | 67.15 | 66.51 | 72.7 | 73.2 |
| $Cl^-$ | 0.41 | 0.1 | 0.27 | 0.15 | 0.11 | 0.1 | 0.1 |
| $I^-$ | | | | | | | |
| $Br^-$ | | | | | | | |
| $Cl^- + I^- + Br^-$ | 0.41 | 0.1 | 0.27 | 0.15 | 0.11 | 0.1 | 0.1 |
| nd | 1.5945 | 1.5955 | 1.5932 | 1.5948 | 1.5952 | 1.5992 | 1.6014 |
| υd | 68.4 | 68.0 | 68.25 | 68.1 | 67.85 | 67.18 | 67.05 |
| $\Delta P_{g \cdot F}$ | 0.0151 | 0.0148 | 0.0148 | 0.0150 | 0.145 | 0.156 | 0.0158 |
| Tg (° C.) | 575 | 587 | 560 | 476 | 559 | 586 | 590 |
| B($10^{-12}$/Pa) | 0.41 | 0.45 | 0.36 | 0.35 | 0.34 | 0.41 | 0.40 |
| L.T(° C.) | ≤850 | ≤880 | ≤850 | ≤850 | ≤880 | ≤850 | ≤850 |
| $F_A$ | 320 | 356 | 335 | 346 | 345 | 388 | 390 |
| $D_W$ | 1 | 1 | 1 | 1 | 1 | 1 | 1 |
| $D_A$ | 2 | 1 | 1 | 2 | 1 | 1 | 2 |
| λ80/λ5 | 37/30 | 36/30 | 37/31 | 37/31 | 37/31 | 37/32 | 37/32 |

TABLE 4

| | Comparison Examples | | |
|---|---|---|---|
| Composition | 1 (Raw materials in mass percentage shown in parentheses) | 2 (Raw materials in mass percentage shown in parentheses) | 3 |
| $P^{5+}$ | 38.05 (Al(PO$_3$)$_3$: 30) | 50.336 (Al(PO$_3$)$_3$: 47.6) | 47.8 |
| $Al^{3+}$ | 12.68 | 16.779 | 6.2 |
| $Ba^{2+}$ | 22.28 (BaF2: 35) | 11.674 (BaF2: 22) | 17.2 |
| $Sr^{2+}$ | 17.76 (SrF$_2$: 20) | 8.145 (SrF$_2$: 11) | |
| $Ca^{2+}$ | | | 15.1 |
| $La^{3+}$ | | 5.139 (La$_2$O$_3$: 9) | |
| $Gd^{3+}$ | 9.23 (Gd$_2$O$_3$: 15) | | 1 |
| $Y^{3+}$ | | 7.679 (YF$_3$: 3; Y$_2$O$_3$: 7) | |
| $La^{3+} + Gd^{3+} + Y^{3+}$ | 9.23 | 12.818 | 1 |

TABLE 4-continued

| Composition | Comparison Examples | | |
|---|---|---|---|
| | 1 (Raw materials in mass percentage shown in parentheses) | 2 (Raw materials in mass percentage shown in parentheses) | 3 |
| $(Sr^{2+} + Ca^{2+} + La^{3+} + Gd^{3+} + Y^{3+})/Ba^{2+}$ | 1.211 | 1.796 | 0.936 |
| $Mg^{2+}$ | | | 7.7 |
| $Zn^{2+}$ | | | 5 |
| $Yb^{3+}$ | | | |
| $Li^+$ | | | |
| $Na^+$ | | | |
| $K^+$ | | | |
| $Sb^{3+}$ | | | |
| $Sn^{4+}$ | | 0.247 ($SnO_2$: 0.4) | |
| $Ce^{4+}$ | | | |
| $Sb^{3+} + Sn^{4+} + Ce^{4+}$ | | 0.247 | |
| $B^{3+}$ | | | |
| $Si^{4+}$ | | | |
| $Ge^{4+}$ | | | |
| $F^-$ | 38.48 | 21.278 | 29.6 |
| $O^{2-}$ | 61.52 | 78.722 | 70.4 |
| $Cl^-$ | | | |
| $I^-$ | | | |
| $Br^-$ | | | |
| $Cl^- + I^- + Br^-$ | | | |
| nd | 1.5959 | | 1.5755 |
| vd | 68.5 | | 68.0 |
| $\Delta P_{g,F}$ | 0.0143 | | 0.0131 |
| Tg (° C.) | 512 | | |
| B ($10^{-12}$/Pa) | | | |
| L.T(° C.) | ≥920 | 1300° C. vitrification failed | |
| $F_A$ | 490 | | |
| $D_W$ | 1 | | |
| $D_A$ | 1 | | |
| λ80/λ5 | 35/29 | | |

From the above embodiments we can see that the fluorophosphate optical glass obtained in this invention, wherein the refraction index (nd) is greater than 1.59 and the Abbe number (vd) is greater than 67, has good special dispersion, good chemical stability and grinding property as well as excellent heat stability. Therefore, the glass in the present invention is applicable to the optical design for using optical system to eliminate high class chromatic aberration; and the optical instruments, such as high-performance sphere, aspheric surface, plane lens prism and raster made by high precision molding, secondary hot molding and cold working. The optical glass, having photoelastic coefficient less than $0.5 \times 10^{-12}$ Pa, is applicable in area with high demand on refractive index and heat stability of glass.

The invention claimed is:

1. A fluorophosphate optical glass, containing, by cation percentage contents, 30-40% of $P^{5+}$, 12-20% of $Al^{3+}$, 30-40% of $Ba^{2+}$, 1.3-12% of $Ca^{2+}$, 1-10% of $Sr^{2+}$, 0-5% of $La^{3+}$, 0-6% of $Gd^{3+}$, 0-10% of $Y^{3+}$, and containing, by anion percentage contents, 25-40% of $F^-$ and 60-75% of $O^{2-}$, wherein
the content of $(Sr^{2+}+Ca^{2+}+La^{3+}+Gd^{3+}+Y^{3+})/Ba^{2+}$ is 0.22-0.65.

2. The fluorophosphates optical glass according to claim 1, wherein $Gd^{3+}$ is present in an amount of 3.02-6%.

3. The fluorophosphate optical glass according to claim 1, wherein the content of $Ba^{2+}$ is 33-37.8%, and the content of $Sr^{2+}$ is 2-8%.

4. The fluorophosphate optical glass according to claim 1, wherein the total amount of $La^{3+}$, $Gd^{3+}$ and $Y^{3+}$ is 2-10%.

5. The fluorophosphate optical glass according to claim 1, further containing 32-37.5% of $P^{5+}$, 12-19% of $Al^{3+}$, 32-38% of $Ba^{2+}$, 1.5-8% of $Ca^{2+}$, 1-8% of $Sr^{2+}$, 0-4% of $La^{3+}$, 1-5% of $Gd^{3+}$, 1-8% of $Y^{3+}$, 28-35% of $F^-$ and 65-72% of $O^{2-}$.

6. The fluorophosphate optical glass according to claim 1, wherein the content of $(Sr^{2+}+Ca^{2+}+La^{3+}+Gd^{3+}+Y^{3\pm})/Ba^{2+}$ is 0.25-0.50.

7. The fluorophosphate optical glass according to claim 1, wherein the content of $Al^{3+}/P^{5+}$ is less than 0.63.

8. The fluorophosphate optical glass according to claim 1, wherein the photoelastic coefficient B of the optical glass is less than $0.5 \times 10^{-12}$ Pa.

9. The fluorophosphate optical glass according to claim 1, wherein the special dispersion $\Delta Pg$, F of the optical glass is above 0.011.

10. The fluorophosphate optical glass according to claim 1, wherein the abrasiveness $F_A$ of the optical glass is less than 450.

11. The fluorophosphates optical glass according to claim 1, which has a refractive index nd greater than 1.59 and an Abbe number vd greater than 67.

12. An optical element, prepared by the fluorophosphate optical glass according to claim 1.

13. The fluorophosphate optical glass according to claim 1, further containing, by cation percentage contents: 0-5% of $Mg^{2+}$, 0-5% of $Zn^{2+}$, 0-3% of $Si^{4+}$, 0-5% of $B^{3+}$, 0-3% of $Ge^{4+}$, 0-12% of $Li^+$, 0-5% of $Na^+$, 0-5% of $K^+$, 0-5% of $Yb^{3+}$, 0-0.5% of $Sb^{3+}$, 0-1% of $Sn^{4+}$ and 0-1% of $Ce^{4+}$; and containing, by anion percentage contents, 0-1% of $Cl^-$, 0-1% of $I^-$ and 0-1% of $Br^-$.

14. The fluorophosphate optical glass according to claim 13, further containing 0-3% of $Mg^{2+}$, 0-3% of $Zn^{2+}$, 0-1% of $Si^{4+}$, 0-1% of $Ge^{4+}$, 0-2% of $B^{3+}$, 0-10% of $Li^+$, 0-3% of Na$^+$, 0-3% of K$^+$, wherein the total amount of Cl$^-$+I$^-$+Br$^-$ is greater than 0 but less than or equal to 1%.

15. The fluorophosphate optical glass according to claim 13, wherein the Li$^+$ is present and Na$^+$ and K$^+$ are not present.

16. The fluorophosphate optical glass according to claim 13, wherein the total amount of Cl$^-$+I$^-$+Br$^-$ is greater than 0 but less than or equal to 0.8%.

17. The fluorophosphate optical glass according to claim 13, wherein the Cl$^-$ is present and I$^-$ and Br$^-$ are not present.

18. The fluorophosphate optical glass according to claim 13, wherein the total amount of Sb$^{3+}$+Sn$^{4+}$+Ce$^{4+}$ is greater than 0 but less than or equal to 1%.

19. The fluorophosphate optical glass according to claim 13, wherein at least one of Sb$^{3+}$, Sn$^{4+}$ and Ce$^{4+}$ and at least one of Cl$^-$, I$^-$ and Br$^-$ are applied as clarifying agent.

20. The fluorophosphate optical glass according to claim 13, wherein the P$^{5+}$ is introduced by metaphosphate; the Al$^{3+}$ is introduced in the form of one or more of Al(PO$_3$)$_3$, AlF$_3$ and Al$_2$O$_3$; the Ba$^{2+}$ is introduced in the form of one or more of Ba(PO$_3$)$_2$, BaF$_2$, BaCO$_3$, BaCl$_2$ and Ba(NO$_3$)$_2$; the Ca$^{2+}$, Sr$^{2+}$ and Mg$^{2+}$ are respectively introduced in the form of one or more of fluoride, metaphosphate and carbonate thereof; the La$^{3+}$, Gd$^{3+}$, Y$^{3+}$ and Yb$^{3+}$ are introduced in the form of one or more of oxide and fluroide; the Sb$^{3+}$, Sn$^{4+}$ and Ce$^{4+}$ are introduced in the form of one or more of oxide and fluroide; the F$^-$ is introduced in the form of fluoride; the O$^{2-}$ is introduced in the form of one or more of metaphosphate, oxide, carbonate and nitrate; and the Cl$^-$, I$^-$ and Br$^-$ are respectively introduced in the form of BaCl$_2$, KI and KBr.

* * * * *